(12) United States Patent
Klosinski et al.

(10) Patent No.: US 9,874,143 B2
(45) Date of Patent: Jan. 23, 2018

(54) SYSTEM FOR GENERATING STEAM AND FOR PROVIDING COOLED COMBUSTION GAS TO A SECONDARY GAS TURBINE COMBUSTOR

(71) Applicant: General Electric Company, Schenectady, NY (US)

(72) Inventors: Joseph Philip Klosinski, Kennesaw, GA (US); Alston Ilford Scipio, Mableton, GA (US); Sanji Ekanayake, Mableton, GA (US); Paul Robert Fernandez, Woodstock, GA (US)

(73) Assignee: General Electric Company, Schenectady, NY (US)

( * ) Notice: Subject to any disclaimer, the term of this patent is extended or adjusted under 35 U.S.C. 154(b) by 282 days.

(21) Appl. No.: 14/969,224

(22) Filed: Dec. 15, 2015

(65) Prior Publication Data

US 2017/0167374 A1    Jun. 15, 2017

(51) Int. Cl.
*F02C 7/18* (2006.01)
*F02C 6/18* (2006.01)
*F02C 3/34* (2006.01)
*F02C 3/13* (2006.01)
*F02C 7/141* (2006.01)
(Continued)

(52) U.S. Cl.
CPC ............... *F02C 3/34* (2013.01); *F02C 3/13* (2013.01); *F02C 6/04* (2013.01); *F02C 7/141* (2013.01); *F02C 7/16* (2013.01); *F05D 2220/32* (2013.01); *F05D 2260/211* (2013.01); *F05D 2260/213* (2013.01); *F05D 2260/601* (2013.01); *F05D 2270/13* (2013.01); *Y02E 20/14* (2013.01); *Y02E 20/16* (2013.01)

(58) Field of Classification Search
CPC .... F02C 6/08; F02C 9/18; F02C 7/185; F02C 6/18; F01D 25/30; F01D 25/305; F01K 23/10
USPC .......................................................... 60/39.5
See application file for complete search history.

(56) References Cited

U.S. PATENT DOCUMENTS 5,581,996 A * 12/1996 Koch ...................... F01D 5/141
                                                                    60/266
5,611,197 A *  3/1997 Bunker ................... F02C 7/185
                                                                    415/115
(Continued)

OTHER PUBLICATIONS

Co-pending U.S. Appl. No. 14/969,032, filed Dec. 15, 2015.
(Continued)

*Primary Examiner* — William H Rodriguez
(74) *Attorney, Agent, or Firm* — Dority & Manning, P.A.

(57) ABSTRACT

A power plant includes a first gas turbine and a second gas turbine. The first gas turbine includes a turbine extraction port that is in fluid communication with a hot gas path of the turbine and an exhaust duct that receives exhaust gas from the turbine outlet. The power plant further includes a first gas cooler having a primary inlet fluidly coupled to the turbine extraction port, a secondary inlet fluidly coupled to a coolant supply system and an outlet in fluid communication with the exhaust duct. The first gas cooler provides a cooled combustion gas to the exhaust duct which mixes with the exhaust gas to provide an exhaust gas mixture to a first heat exchanger downstream from the exhaust duct. The first gas cooler is also in fluid communication with a combustor of the second gas turbine.

20 Claims, 4 Drawing Sheets

(51) Int. Cl.
*F02C 7/16* (2006.01)
*F02C 6/04* (2006.01)

(56) References Cited

U.S. PATENT DOCUMENTS

| | | | |
|---|---|---|---|
| 5,867,987 A | 2/1999 | Halimi et al. | |
| 6,065,282 A * | 5/2000 | Fukue | F02C 7/185 |
| | | | 415/115 |
| 6,098,395 A * | 8/2000 | North | F01D 5/085 |
| | | | 60/782 |
| 6,250,061 B1 * | 6/2001 | Orlando | F01D 9/065 |
| | | | 60/772 |
| 6,442,941 B1 | 9/2002 | Anand et al. | |
| 6,543,234 B2 | 4/2003 | Anand et al. | |
| 8,209,951 B2 | 7/2012 | Hibshman, II | |
| 8,844,262 B2 | 9/2014 | Sutterfield | |
| 9,103,279 B2 | 8/2015 | Zhang et al. | |
| 2010/0175387 A1 * | 7/2010 | Foust | F01D 9/023 |
| | | | 60/782 |
| 2016/0123190 A1 * | 5/2016 | Klosinski | F02C 6/04 |
| | | | 60/772 |

OTHER PUBLICATIONS

Co-pending U.S. Appl. No. 14/969,051, filed Dec. 15, 2015.
Co-pending U.S. Appl. No. 14/969,594, filed Dec. 15, 2015.
Co-pending U.S. Appl. No. 14/969,067, filed Dec. 15, 2015.
Co-pending U.S. Appl. No. 14/969,079, filed Dec. 15, 2015.
Co-pending U.S. Appl. No. 14/969,098, filed Dec. 15, 2015.
Co-pending U.S. Appl. No. 14/969,118, filed Dec. 15, 2015.
Co-pending U.S. Appl. No. 14/969,142, filed Dec. 15, 2015.
Co-pending U.S. Appl. No. 14/969,157, filed Dec. 15, 2015.
Co-pending U.S. Appl. No. 14/969,165, filed Dec. 15, 2015.
Co-pending U.S. Appl. No. 14/969,185, filed Dec. 15, 2015.
Co-pending U.S. Appl. No. 14/969,200, filed Dec. 15, 2015.

* cited by examiner

SYSTEM FOR GENERATING STEAM AND FOR PROVIDING COOLED COMBUSTION GAS TO A SECONDARY GAS TURBINE COMBUSTOR

FIELD OF THE INVENTION

The present invention generally relates to a gas turbine power plant such as a combined cycle or cogeneration power plant. More particularly, the present invention relates to a system for generating steam and for providing cooled combustion gases to a combustor of a secondary gas turbine of the power plant.

BACKGROUND OF THE INVENTION

A gas turbine power plant such as a combined cycle or cogeneration power plant generally includes a gas turbine having a compressor, a combustor, a turbine, a heat recovery steam generator (HRSG) that is disposed downstream from the turbine and a steam turbine in fluid communication with the HRSG. During operation, air enters the compressor via an inlet system and is progressively compressed as it is routed towards a compressor discharge or diffuser casing that at least partially surrounds the combustor. At least a portion of the compressed air is mixed with a fuel and burned within a combustion chamber defined within the combustor, thereby generating high temperature and high pressure combustion gas.

The combustion gas is routed along a hot gas path from the combustor through the turbine where they progressively expand as they flow across alternating stages of stationary vanes and rotatable turbine blades which are coupled to a rotor shaft. Kinetic energy is transferred from the combustion gas to the turbine blades thus causing the rotor shaft to rotate. The rotational energy of the rotor shaft may be converted to electrical energy via a generator. The combustion gas exits the turbine as exhaust gas and the exhaust gas enters the HRSG. Thermal energy from the exhaust gas is transferred to water flowing through one or more heat exchangers of the HRSG, thereby producing superheated steam. The superheated steam is then routed into the steam turbine which may be used to generate additional electricity, thus enhancing overall power plant efficiency.

Regulatory requirements for low emissions from gas turbine based power plants have continually grown more stringent over the years. Environmental agencies throughout the world are now requiring even lower levels of emissions of oxides of nitrogen (NOx) and other pollutants and carbon monoxide (CO) from both new and existing gas turbines.

Traditionally, due at least on part to emissions restrictions, the gas turbine load for a combined cycle or cogeneration power plant has been coupled to or driven by steam production requirements for the power plant and not necessarily by grid power demand. For example, to meet power plant steam demand while maintaining acceptable emissions levels, it may be necessary to operate the gas turbine at full-speed full-load conditions, even when grid demand or power plant demand for electricity is low, thereby reducing overall power plant efficiency.

BRIEF DESCRIPTION OF THE INVENTION

Aspects and advantages of the invention are set forth below in the following description, or may be obvious from the description, or may be learned through practice of the invention.

One embodiment of the present invention is power plant. The power plant includes a first gas turbine including a compressor, a combustor downstream from the compressor, a turbine disposed downstream from the combustor and an exhaust duct downstream from an outlet of the turbine. The turbine includes at least one turbine extraction port in fluid communication with a hot gas path of the turbine. The exhaust duct receives exhaust gas from the turbine outlet and the turbine extraction port(s) defines a flow path for a stream of combustion gas to flow out of the hot gas path. The power plant further includes a first gas cooler having a primary inlet fluidly coupled to the turbine extraction port, a secondary inlet fluidly coupled to a coolant supply system and an outlet that is in fluid communication with the exhaust duct. The first gas cooler provides a cooled combustion gas to the exhaust duct which mixes with the exhaust gas to provide an exhaust gas mixture to a first heat exchanger downstream from the exhaust duct. The power plant further includes a second gas turbine comprising a compressor, a combustor and a turbine. The combustor of the second gas turbine is in fluid communication with the outlet of the first gas cooler.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

In a conventional co-generation power plant, fuel and air are supplied to a gas turbine. Air passes through an inlet of the gas turbine into the compressor section upstream of combustors in the gas turbine. After the air is heated by combustors, the heated air and other gases produced in the process (i.e., combustion gas) pass through the turbine section. The full volume of exhaust gas from the gas turbine passes from the turbine section to an exhaust section of the gas turbine, and flows to a heat recovery steam generator (HRSG) that extracts heat from the exhaust gas via one or more heat exchangers to produce steam.

In certain instances, the demand for steam may be lower than the amount of steam that could be generated by the gas turbine exhaust, some of the exhaust gas could be directed away from the heat recovery steam generator, such as being transported to an exhaust stack that filters the exhaust gas prior to being released into the atmosphere. Alternatively, if steam production is in higher demand than the steam generated by the gas turbine exhaust, then an increase in exhaust gas from the gas turbine could be produced to generate the steam desired.

The present embodiments provide a system to cool or temper hot combustion gas extracted directly from a turbine of a gas turbine prior to being mixed with exhaust gas flowing from an outlet of the turbine and for providing a stream of cooled combustion gas to a second or secondary gas turbine, particularly to a compressor and/or a turbine of the second gas turbine. Although the combustion gas is cooled via an gas cooler using compressed air extracted from the compressor, the cooled combustion gas is still significantly hotter than exhaust gas flowing from the turbine. As a result, the thermal energy from the cooled combustion gas raises the temperature of the exhaust gas upstream from a heat exchanger/boiler and/or heat recovery steam generator (HRSG), thereby enhancing steam production from the gas turbine.

The steam may be piped to a steam turbine, used for heat production and/or for other industrial processes. The system can be used in a cogeneration system such that the cogeneration system can produce a higher quantity of steam without producing a proportional increase of power. The embodiment system thus provides an efficient use of the fuel input into the cogeneration system, and avoids wasteful production of undesired power by the gas turbine. The potential benefits to the second gas turbine may include enhanced compressor efficiency, enhanced turbine efficiency and/or enhanced turbine cooling.

The embodiments provided herein provide various technical advantages over existing cogenerations or combined cycle power plants. For example, the system provided herein may include the ability to modulate steam production at a desired level while maintaining thermal and other operating efficiencies; the ability to provide a higher temperature gas to produce more steam downstream of the gas turbine; the ability to operate at a lower power output on the gas turbine and generate more steam; the ability to minimize wasteful products (i.e., producing unnecessary power in the gas turbine); and the ability to operate a cogeneration system at a more cost effective and efficient capacity.

Figure 1:
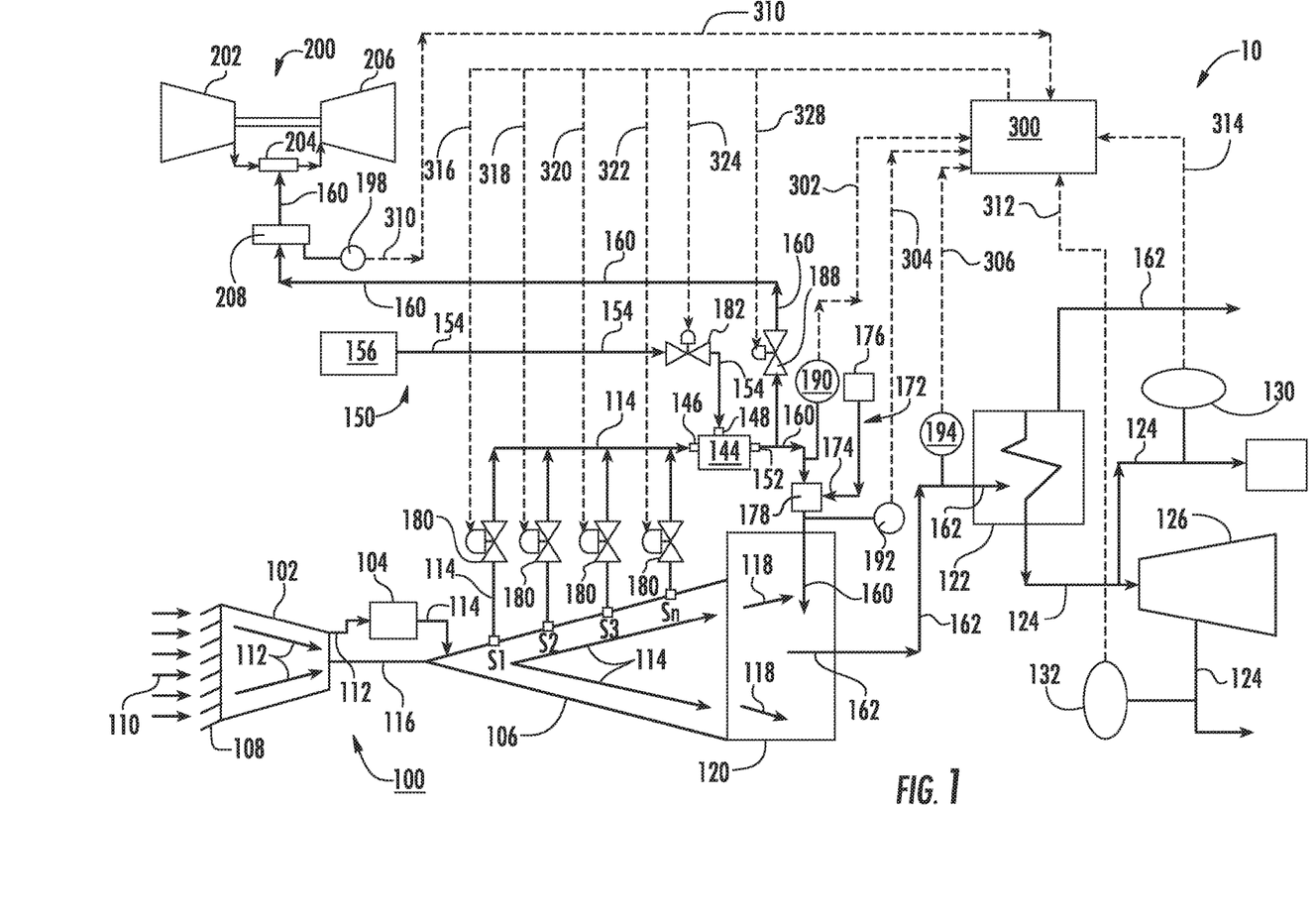
FIG. 1 is a schematic diagram of an exemplary gas turbine based cogeneration power plant according to one embodiment of the present invention.

Referring now to the drawings, wherein identical numerals indicate the same elements throughout the figures, FIG. 1 provides a functional block diagram of an exemplary gas turbine power plant 10 with steam production capability. The power plant 10 comprises a first gas turbine 100 that may incorporate various embodiments of the present invention. The first gas turbine 100 generally includes, in serial flow order, a compressor 102, a combustion section having one or more combustors 104 and a turbine 106. The first gas turbine 100 may also include inlet guide vanes 108 disposed at an inlet or upstream end of the compressor 108. In operation, air 110 flows across the inlet guide vanes 108 and into the compressor 102. The compressor 102 imparts kinetic energy to the air 110 to produce compressed air as indicated schematically by arrows 112.

The compressed air 112 is mixed with a fuel such as natural gas from a fuel supply system to form a combustible mixture within the combustor(s) 104. The combustible mixture is burned to produce combustion gas as indicated schematically by arrows 114 having a high temperature, pressure and velocity. The combustion gas 114 flows through various turbine stages S1, S2, S3, Sn of the turbine 106 to produce work.

The turbine 106 may have two or more stages, for example, a low pressure section and a high pressure section. In one embodiment, the turbine 106 may be a two-shaft turbine that includes a low pressure section and a high pressure section. In particular configurations, the turbine 106 may have 4 or more stages. The turbine 106 may be connected to a shaft 116 so that rotation of the turbine 106 drives the compressor 102 to produce the compressed air 112. Alternately or in addition, the shaft 116 may connect the turbine 106 to a generator (not shown) for producing electricity. The combustion gas 114 loses thermal and kinetic energy as it flows through the turbine 106 and exits the turbine 106 as exhaust gas 118 via an exhaust duct 120 that is operably coupled to a downstream end of the turbine 106.

The exhaust duct 120 may be fluidly coupled to a first heat exchanger or boiler 122 via various pipes, ducts, valves and the like. The heat exchanger 122 may be a standalone component or may be a component of a heat recovery steam generator (HRSG). In various embodiments, the heat exchanger 122 is used to extract thermal energy from the exhaust gas 118 to produce steam 124. In particular embodiments, the steam 124 may then be routed to a steam turbine 126 via various pipes, valves conduits or the like to produce additional power or electricity. At least a portion of the steam 124 may be piped from the heat exchanger 122 to an onsite or offsite facility 128 that distributes the steam to users and/or utilizes the steam for secondary operations such as heat production or other industrial operations or processes. In one embodiment, the steam 124 may be piped downstream from the steam turbine 126 and further utilized for various secondary operations such as heat production or other secondary operations.

Steam flow rate or output from the heat exchanger 122 may be monitored via one or more flow monitors. For example, in one embodiment, a flow monitor 130 may be provided downstream from the heat exchanger 122. In one embodiment, a flow monitor 132 may be disposed downstream from the steam turbine 126.

Figure 2:
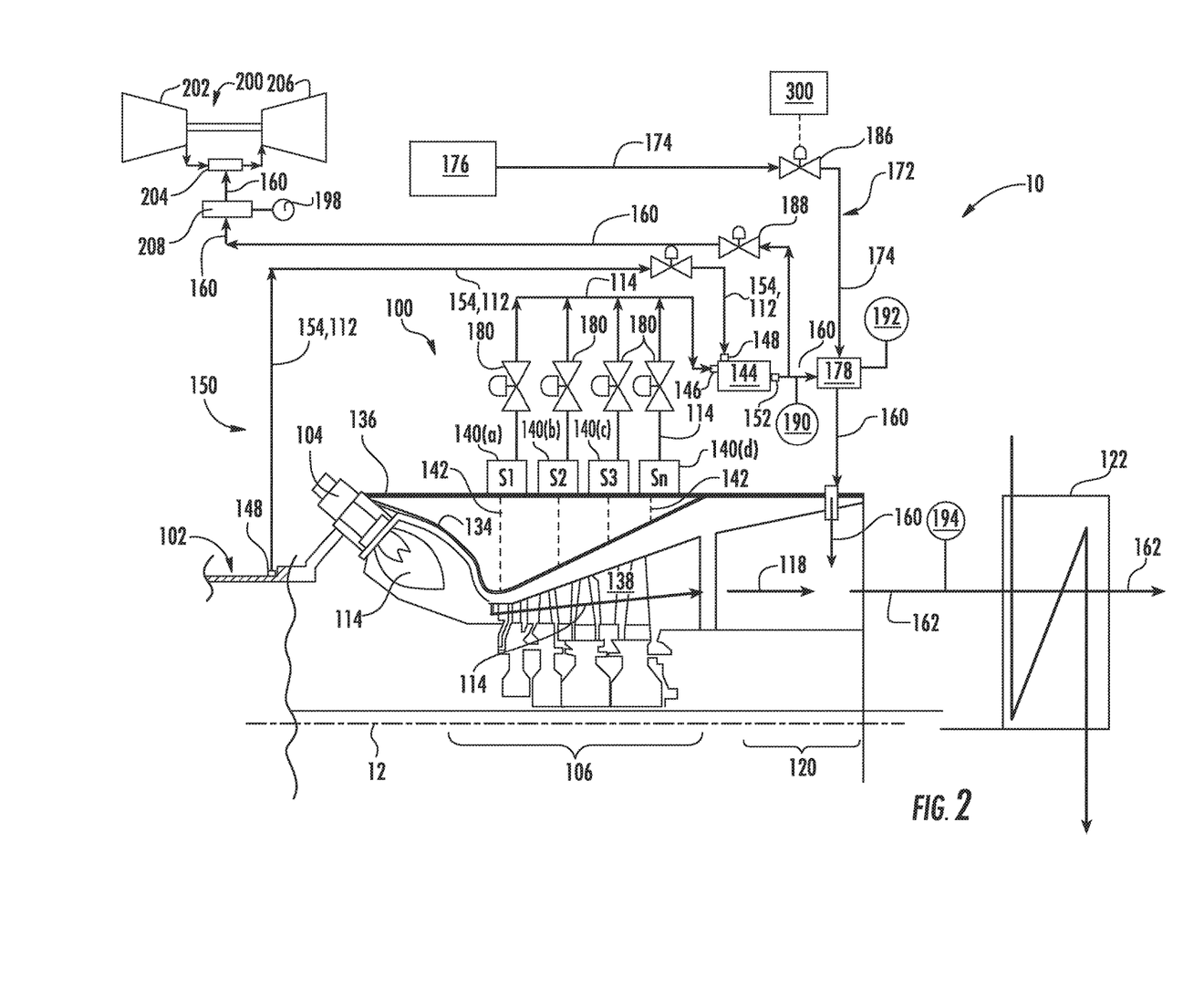
FIG. 2 is a simplified cross sectioned side view of a portion of an exemplary gas turbine according to at least one embodiment of the present invention.

FIG. 2 provides a simplified cross sectional side view of a portion of an exemplary first gas turbine 100 including a portion of the compressor 102, the combustor 104, the turbine 106 and the exhaust duct 120 as may incorporate various embodiments of the present invention. In one embodiment, as shown in FIG. 2, the turbine 106 includes an inner turbine casing 134 and an outer turbine casing 136. The inner and outer turbine casings 134, 136 extend circumferentially about an axial centerline 12 of the first gas turbine 100. The inner turbine casing 134 and/or or the outer turbine casing 136 at least partially encase sequential rows of stator vanes and rotor blades that make up the various stages S1, S2, S3, Sn of the turbine 106.

The turbine casings 134, 136 are normally sealed with only two openings: a combustion gas inlet at the upstream of the turbine 106, and an exhaust gas or turbine outlet at a downstream end of the turbine 106. The downstream end of the turbine 106 is operably connected to the exhaust duct 120. Conventionally, the entire volume of combustion gas 114 passes through a hot gas path 138 defined by the various stages of the turbine 106 within the inner and outer turbine casings 134, 136, into the exhaust duct 120 and at least a portion of the exhaust gas 118 may be directed out of the exhaust duct 120 to the heat exchanger 122.

During operation, if it is determined that the demand for steam production is higher than the demand for power produced by the first gas turbine 100 a portion of the combustion gas 114 may be extracted from one or more of the turbine stages S1, S2, S3, Sn via one or more corresponding turbine extraction ports 140 as shown in FIG. 2. Four turbine extraction ports 140(a-d) are shown for illustration. However, the turbine 106 may include any number of turbine extraction ports 140. For example, the turbine 106 may include one turbine extraction port 140, two turbine extraction ports 140, three turbine extraction ports 140 or four or more turbine extraction ports 140. Each turbine extraction port 140 is fluidly coupled to and/or in fluid communication with one or more of the turbine stages S1, S2, S3, Sn. Each turbine extraction port 140 provides a flow path for a stream of the combustion gas 114 to flow out of the turbine 106 from a point that is downstream from the combustor 104 but upstream from the exhaust duct 120.

As shown in FIG. 2, one or more of the turbine extraction ports 140(a-d) may be in fluid communication with one or more of the turbine stages S1, S2, S3 or Sn via one or more extraction pipes 142. The extraction pipe(s) 142 and the turbine extraction ports 140 provide for fluid communication of the combustion gas 114 from the hot gas path 138, through the inner and/or outer turbine casings 134, 136 and out of the turbine 106 to obtain a portion of the combustion gas 114 at higher temperatures than the exhaust gas 118 flowing into the exhaust duct 120 from outlet of the turbine 106.

As shown in FIG. 2, the stages in the turbine 106 are successive such that the combustion gas 114 flows through the stages from S1 to a last stage Sn. Turbine stage S1 is the first stage and receives hot combustion gas 114 directly from the combustor 104. Temperature of the combustion gas 114 decreases with each successive stage. For example, the combustion gas 114 at the Si turbine stage has a higher temperature than at the subsequent turbine stages, S2, S3, Sn, etc . . . The exhaust gas 118 is at a lower temperature than the combustion gas 114 within the turbine 106 and therefore has less thermal energy.

Figure 3:
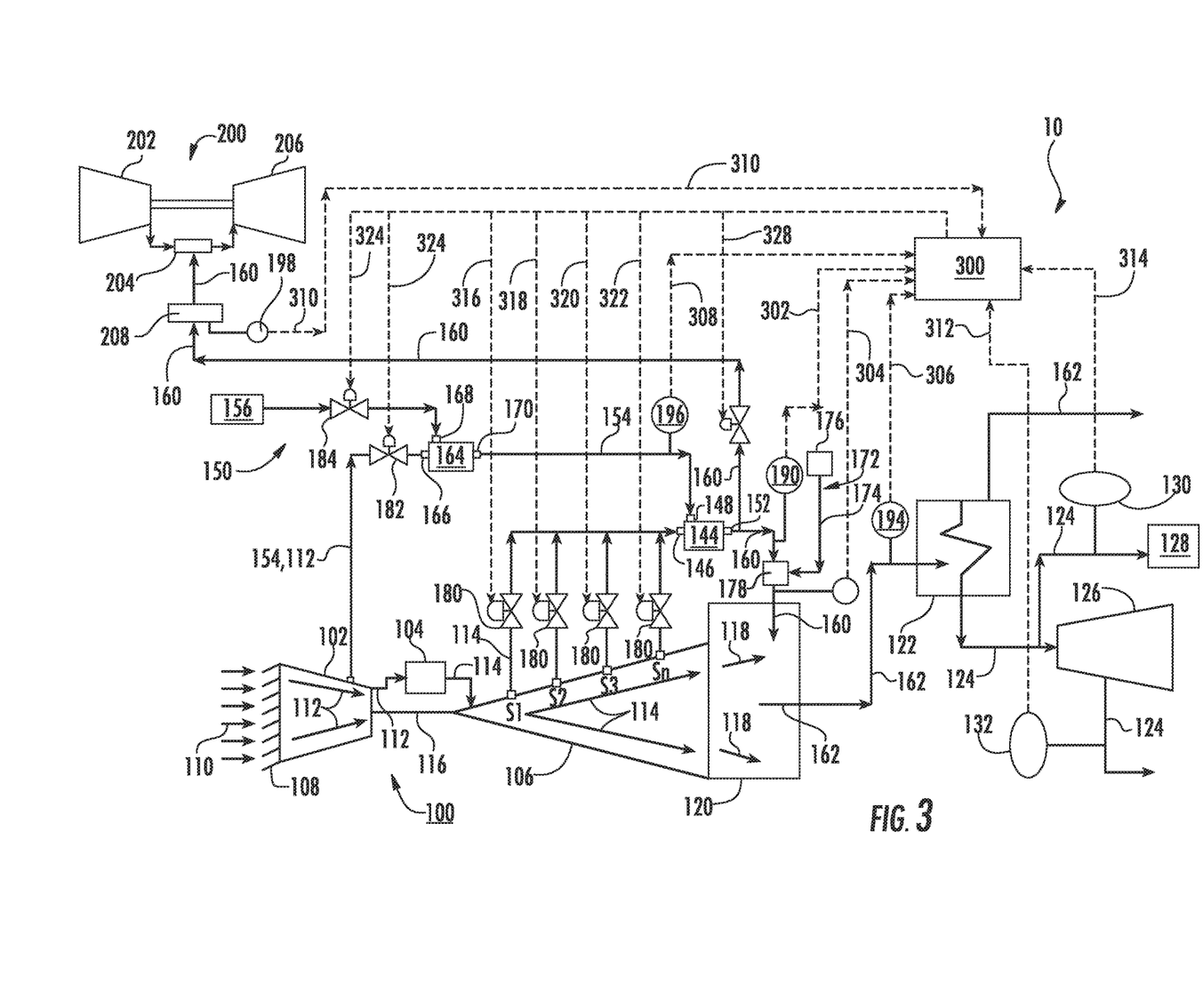
FIG. 3 is a schematic diagram of the exemplary gas turbine based cogeneration power plant as shown in FIG. 1, according to one embodiment of the present invention.

FIG. 3 provides a functional block diagram of the exemplary gas turbine power plant 10 with steam production capability as shown in FIG. 1, according to one embodiment of the present invention. In one embodiment, as shown in FIGS. 1, 2 and 3, the power plant 10 includes a first gas cooler 144. The first gas cooler 144 includes a primary inlet 146 fluidly coupled to one or more of the one or more turbine extraction ports 140, a secondary inlet 148 fluidly coupled via various pipes, conduits, valves or the like to a coolant supply system 150, and an outlet 152 in fluid communication with the exhaust duct 120 via various pipes, conduits, valves or the like. In one embodiment, the first gas cooler 144 comprises an ejector. In one embodiment, the first gas cooler 144 comprises a static mixer. The static mixer generally includes individual mixing elements stacked in series within an outer casing or pipe and in fluid communication with the primary and secondary inlets 146, 148 and with the outlet 152. Each mixing element may be oriented relative to an adjacent mixing element to homogenize two or more fluids flowing through static mixer.

The coolant supply system 150 provides a coolant 154 to the secondary inlet 148 of the first gas cooler 144. In particular embodiments, as shown in FIGS. 1 and 3, the coolant supply system 150 comprises an ambient air supply system 156 for collecting and/or conditioning ambient air upstream from the secondary inlet 148 of the first gas cooler 144. In particular embodiments, as shown in FIGS. 2 and 3 the coolant supply system 150 includes the compressor 102 of the first gas turbine 100. The compressor 102 may be fluidly coupled to the secondary inlet 148 of the first gas cooler 144 via one or more compressor extraction ports 158 and via various pipes, conduits, valves or the like.

The compressor extraction port(s) 158 provide a flow path for a portion of the compressed air 112 to flow out the compressor 102 at a point between an upstream or inlet to the compressor 102 and an outlet of the compressor 102 that is defined upstream or immediately upstream from the combustor 102. Because the compressed air 112 increases in pressure and temperature from the inlet to the outlet, the compressor extraction port(s) 158 may be axially spaced along the compressor 102 at various points to capture a portion of the compressed air 112 at a desired temperature and pressure.

In operation, the extracted combustion gas 114 from the one or more turbine extraction ports 140 acts as a motive fluid flowing through the first gas cooler 144. Ambient air from the ambient air supply 156 or a portion of the compressed air 112 extracted from the compressor extraction port 148 flows into the secondary inlet 148 of the first gas cooler 144 and cools the stream of combustion gas 114 upstream from the exhaust duct 120 and may also increase mass flow from the first gas cooler 144 into the exhaust duct 120. A cooled combustion gas 160 flows from the outlet 152 of the first gas cooler 144 and is routed into the exhaust duct 120 at a higher temperature than the exhaust gas 118. The cooled combustion gas 160 mixes with the exhaust gas 118 within the exhaust duct 120 to provide a heated exhaust gas mixture 162 to the heat exchanger 122 disposed downstream from the exhaust duct 120. Thermal energy from the cooled combustion gas 160 increases the temperature of the exhaust gas 118, thereby increasing steam production capability of the power plant 10.

In particular embodiments, as shown in FIG. 3, the coolant supply system 150 may include a second gas cooler 164 disposed downstream from the compressor extraction port(s) 158 and upstream from the secondary inlet 148 of the first gas cooler 144. The second gas cooler 164 may be fluidly coupled to the compressor extraction port(s) 158 and to the secondary inlet 148 of the first gas cooler 144 via various pipes, conduits, valves or the like. The second gas cooler 164 includes a primary inlet 166 fluidly coupled to the compressor extraction port(s) 158, a secondary inlet 168 in fluid communication with the ambient air supply system 156 and an outlet 170 in fluid communication with the secondary inlet 148 of the first gas cooler 144. In this embodiment, the compressed air 112 from the compressor extraction port(s) 158 acts as a motive fluid through the second gas cooler 164. Air entering the secondary inlet 168 of the second gas cooler 164 from the ambient air supply system 156 cools the stream of compressed air 112 upstream from the secondary inlet 148 of the first gas cooler 144, thereby enhancing cooling of the combustion gases 114 flowing therethrough. The air flowing into the second gas cooler 164 may also increase air mass flow from the compressor extraction port(s) 148 into the first gas cooler 144.

In particular embodiments, as shown in FIGS. 2 and 3, the power plant 10 further comprises a coolant injection system 172 disposed downstream from the outlet 152 of the first gas cooler 144 and upstream from the exhaust duct 120. The coolant injection system 172 may include spray nozzles, a spray tower, a scrubber or other various components (not shown) configured to inject a coolant 174 from a coolant supply 176 into the stream of cooled combustion gas 160 flowing from the outlet 152 of the first gas cooler 144, thereby further cooling the cooled combustion gas 160 upstream from the exhaust duct 120.

In particular embodiments, as shown in FIGS. 2 and 3, the coolant injection system 172 may include a mixing chamber 178 fluidly coupled to and positioned downstream from the outlet 152 of the first gas cooler 144. The mixing chamber 178 may be fluidly coupled to the exhaust duct 120 via various pipes, conduits, valves or the like. The mixing chamber 178 may be configured to blend the stream of cooled combustion gas 160 from the first gas cooler 144 outlet 152 and the coolant 174 from the coolant supply 176 upstream of the exhaust duct 120. In this manner, the coolant 174 may be used to further reduce or control the temperature of the cooled combustion gas 160 upstream from the heat exchanger 122 and/or the exhaust duct 120. The coolant 174 may be any liquid or gas that may be mixed with the combustion gas 160 for its intended purpose. In one embodiment, the coolant 174 is water. In one embodiment the coolant 174 comprises steam.

In various embodiments as shown in FIGS. 1-3, the power plant 10 includes a second gas turbine 200 fluidly coupled to and disposed downstream from the outlet 152 of the first gas cooler 144. The second gas turbine 200 comprises in serial flow order, a compressor 202, a combustion system having at least one combustor 204 and a turbine 206. In particular embodiments, the combustor 204 of the second gas turbine 200 may be fluidly coupled to the outlet 152 of the first gas cooler 144 via various pipes, conduits, valves or the like. In particular embodiments, a second heat exchanger 208 is fluidly coupled to and disposed downstream from the outlet 152 of the first gas cooler 144 and is fluidly coupled to and disposed upstream from the combustor 204 of the second gas turbine 200.

Figure 4:
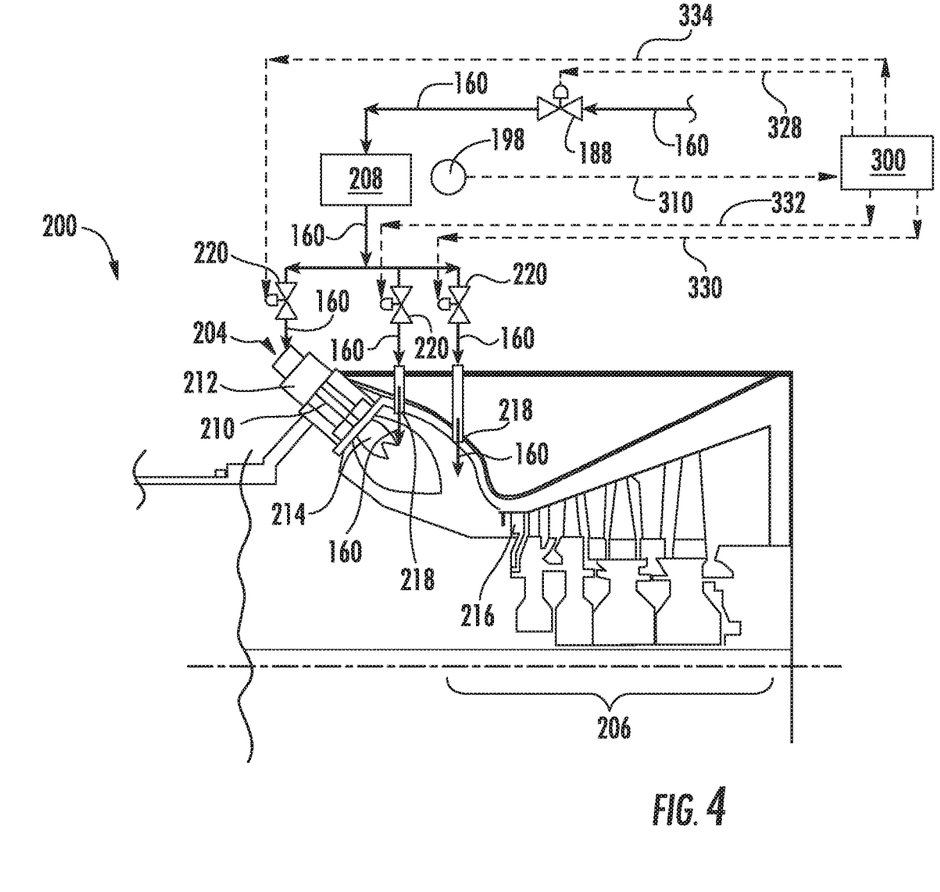
FIG. 4 is a simplified cross sectioned side view of a portion of an exemplary second gas turbine of the power plant as shown in FIGS. 1-3 including a portion of an exemplary combustor according to at least one embodiment of the present invention.

FIG. 4 is a simplified cross sectioned side view of a portion of the second gas turbine 200 of the power plant 10 as shown in FIGS. 1-3 including a portion the combustor 204 according to at least one embodiment of the present invention. As shown in FIG. 4, the combustor 204 may include one or more fuel nozzles 210 that extend from an end cover 212 towards a primary combustion zone 214 defined within the combustor 204. In one embodiment, at least one fuel nozzle 210 of the plurality of fuel nozzles 210 is in fluid communication with the outlet 152 of the first gas cooler 144 and/or in fluid communication with the second heat exchanger 208.

In particular embodiments, the combustor 202 is in fluid communication with the outlet 152 of the first gas cooler 144 and/or in fluid communication with the second heat exchanger 208 at one or more points downstream from the plurality of fuel nozzles 210 but upstream from an inlet 216 to the turbine 206. For example, in one embodiment, the combustor 204 includes one or more fuel injectors or late lean fuel injectors 218 disposed downstream from the plurality of fuel nozzles 210 and upstream from the turbine inlet 216. Various pipes, coupling, fittings conduits or the like may be incorporated around and/or into the structure of the combustor 204 to provide one or more flow paths between combustor 202 and the outlet 152 of the first gas cooler 144 and/or the second heat exchanger 208.

In operation, a portion of the cooled combustion gas 160 may be routed from a point downstream from the outlet 152 of the first gas cooler 144 but upstream from the exhaust duct 122 to the combustor 204 of the second gas turbine 200. The cooled combustion gas 160 may be used to add thermal energy to the combustor 204, thereby enhancing combustion efficiency and/or to maintain emissions compliance at various operational modes of the second gas turbine 200.

Referring to FIGS. 1, 2 3 and 4 collectively, a controller 300 may be used to determine the desired steam production capacity and/or to regulate flow of the cooled combustion gas 160 to the second gas turbine 200 combustor 204 by generating and/or sending appropriate control signals to various control valves 180 fluidly coupled to one or more of the turbine extraction ports 140, and/or to one or more control valves 182, 184 of the coolant supply system 150, and/or to one or more control valves 186 (FIG. 2) of the coolant injection system 172, and/or to one or more control valves 188 disposed between the outlet 152 of the first gas cooler 144 and the second gas turbine 200, and/or to one or more control valves 220 disposed between the heat exchanger 208 and the second gas turbine 200 combustor 204. The controller 300 may be a microprocessor based processor that includes a non-transitory memory and that has the capability to calculate algorithms.

The controller 300 may incorporate a General Electric SPEEDTRONIC™ Gas Turbine Control System, such as is described in Rowen, W. I., "SPEEDTRONIC™ Mark V Gas Turbine Control System", GE-3658D, published by GE Industrial & Power Systems of Schenectady, N.Y. The controller 300 may also incorporate a computer system having a processor(s) that executes programs stored in a memory to control the operation of the gas turbine using sensor inputs and instructions from human operators.

In particular embodiments, the controller 300 is programmed to determine a desired temperature of exhaust gas required to generate the desired amount of steam flow, to regulate combustion gas flow through valve(s) 180, air flow through valve(s) 182, 184, coolant flow through valve 186 and cooled combustion gas flow to the second gas turbine via valve 188 and/or valve(s) 220 to achieve the desired temperature of the exhaust gas mixture 162 being sent to the heat exchanger 122 and to achieve desired flow rate of the cooled combustion gas 160 to the combustor 204 of the second gas turbine 200.

In operation, as shown collectively in FIGS. 1-4, the controller 300 may receive various input data signals, such as cooled combustion gas temperature 302 from a temperature monitor 190 (FIGS. 1-3) disposed downstream from the outlet 152 of the first gas cooler 144, and/or combustion gas temperature 304 from a temperature monitor 192 (FIGS. 2-3) disposed at or downstream from the mixing chamber 178, and/or exhaust gas mixture temperature 306 from a temperature monitor 194 (FIGS. 1-3) disposed downstream from the exhaust duct 120 and/or upstream from the heat exchanger 122, and/or coolant temperature 308 from a temperature monitor 196 (FIG. 3) disposed downstream from the outlet 170 of the second gas cooler 164, and/or cooled combustion gas temperature 310 from a temperature monitor 198 (FIGS. 1-3) disposed at or downstream from the second heat exchanger 208.

The controller 300 may also receive steam flow data 312 from flow monitor 132 and/or steam flow data 314 from flow monitor 130. In response to one or more data signals 302, 304, 306, 308, 310, 312, 314 the controller 300 may actuate one or more of valve(s) 180, 182, 184, 186, 188 and 220 to control combustion gas flow from the turbine stages S1-Sn, compressed air flow rate into the first gas cooler 144 secondary inlet 148, coolant flow rate into the mixing chamber 178 and/or cooled combustion gas flow to the second gas turbine 200, particularly to the combustor 204 of the second gas turbine 200 to produce the desired temperature of the exhaust gas mixture 162 and to produce the desired temperature and/or flow rate of the cooled combustion gas 160 to the combustor 204 of the second gas turbine 200.

Steam flow output from the steam turbine 126 may be monitored via the controller 300 using flow monitor 132. Steam flow output to secondary operations may be monitored via the controller 300 using flow monitor 130. Controller 300 may actuate one or more of valve(s) 180, 182, 184, 186, 188 to control combustion gas flow from the turbine stages S1-Sn, coolant flow rate into the first gas cooler 144 secondary inlet 148, coolant flow rate to the mixing chamber 178 to produce the desired temperature of the exhaust gas mixture 162 and/or a desired steam output from the heat exchanger 122 based at least in part on flow output as measured by at least one of flow monitors 130, 132.

Data signals received by the controller 300, such as combustion gas temperature, cooled combustion gas temperature, exhaust gas temperature, mixed exhaust gas temperature and steam flow rate, may be analyzed to compare with a predetermined desired amount of steam flow. The controller 300 may use the received data signals to determine if an increase in exhaust gas temperature would be desired. Calculations include determining the quantity of steam needed and the amount of power desired, and determining the temperature and quantity of combustion gas needed to produce the desired quantity of steam.

After determining the desired temperature and quantity of combustion gas 114 required for the heat exchanger 122 to produce desired steam quantity, the controller 300 may generate and send one or more signals 316, 318, 320, 322 (FIGS. 1 and 3) to the receiver of the appropriate valve(s) 180 to extract combustion gas 114 through the turbine casings 134, 136 at the appropriate turbine stage S1, S2, S3, Sn. The controller 300 may send a signal 324 to the receiver of either or both valves 182, 184 to control the flow rate of the coolant 154 flowing into the secondary inlet 148 of the first gas cooler 144. The controller 300 may also send a signal 326 to valve 186 (FIG. 2) to modulate flow of the coolant 174 at a desired amount into the mixing chamber 178 and/or into the stream of cooled combustion gas 160 from the outlet 152 of the first gas cooler 144 to further cool the cooled combustion gas 160 to a desired temperature.

The controller 300 may send a signal 328 (FIGS. 1 and 3) to the receiver of valve 188 to control the flow rate of the cooled combustion gas 160 flowing to the second gas turbine 200. The controller 300 may send one or more signals 330, 332, 334 (FIG. 4) to the receiver of valve(s) 220 to control the flow rate of the cooled combustion gas 160 flowing to combustor 204 of the second gas turbine 200 at one or more locations along the combustor 204. The controller 300 and/or the system or systems provided herein automatically blend the exhaust gas 118 with the stream of cooled combustion gas 160 so that the exhaust gas mixture temperature is above a nominal exhaust gas temperature but below the thermal limits of the heat exchanger 122 or HRSG while providing a stream of cooled combustion gas to the combustor 204 of the second gas turbine 200.

Although specific embodiments have been illustrated and described herein, it should be appreciated that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed:

1. A power plant, comprising:
   a first gas turbine including a compressor, a combustor downstream from the compressor, a turbine disposed downstream from the combustor and an exhaust duct downstream from an outlet of the turbine, the turbine including a turbine extraction port in fluid communication with a hot gas path of the turbine, wherein the exhaust duct receives exhaust gas from the turbine outlet and wherein the turbine extraction port defines a flow path for a stream of combustion gas to flow out of the hot gas path;
   a first gas cooler having a primary inlet fluidly coupled to the turbine extraction port, a secondary inlet fluidly coupled to a coolant supply system and an outlet in fluid communication with the exhaust duct, wherein the first gas cooler provides a cooled combustion gas to the exhaust duct, wherein the cooled combustion gas mixes with the exhaust gas to provide an exhaust gas mixture to a first heat exchanger downstream from the exhaust duct; and
   a second gas turbine comprising a compressor, a combustor and a turbine, wherein the combustor is in fluid communication with the outlet of the first gas cooler and receives a portion of the cooled combustion gas therefrom.

2. The power plant as in claim 1, wherein the outlet of the first gas cooler is in fluid communication with one or more fuel nozzles of the combustor of the second gas turbine.

3. The power plant as in claim 1, wherein the outlet of the first gas cooler is in fluid communication with the combustor of the second gas turbine at a point that is downstream from one or more fuel nozzles of the combustor of the second gas turbine.

4. The power plant as in claim 1, wherein the combustor of the second gas turbine comprises a plurality of fuel injectors disposed downstream from a primary combustion zone, wherein the outlet of the first gas cooler is in fluid communication with the plurality of fuel injectors.

5. The power plant as in claim 1, wherein the first heat exchanger extracts thermal energy from the exhaust gas mixture to produce steam.

6. The power plant as in claim 1, further comprising a steam turbine disposed downstream from the first heat exchanger.

7. The power plant as in claim 1, further comprising a second heat exchanger fluidly coupled between the outlet of the first gas cooler and the combustor of the second gas turbine.

8. The power plant as in claim 7, wherein the second heat exchanger extracts thermal energy from the cooled combustion gas upstream from the combustor of the second gas turbine.

9. The power plant as in claim 1, wherein the first gas cooler comprises an ejector.

10. The power plant as in claim 1, wherein the first gas cooler comprises an inline static mixer.

11. The power plant as in claim 1, wherein the coolant supply system comprises an ambient air intake system fluidly coupled to the secondary inlet of the first gas cooler.

12. The power plant as in claim 1, wherein the coolant supply system comprises the compressor of the first gas turbine, wherein the compressor is fluidly coupled to the secondary inlet of the first gas cooler via a compressor extraction port.

13. The power plant as in claim 1, wherein the coolant supply system comprises a second gas cooler having a primary inlet fluidly coupled to the compressor of the first gas turbine, a secondary inlet fluidly coupled to an ambient air intake system and an outlet in fluid communication with the secondary inlet of the first gas cooler.

14. The power plant as in claim 13, wherein the second gas cooler comprises an ejector.

15. The power plant as in claim 13, wherein the second gas cooler comprises an inline static mixer.

16. The power plant as in claim 1, further comprising a coolant injection system disposed downstream from the first gas cooler outlet and upstream from the exhaust duct, wherein the coolant injection system injects a coolant into the stream of cooled combustion gas flowing from the first gas cooler outlet.

17. The power plant as in claim 16, wherein the coolant is water.

18. The power plant as in claim 16, wherein the coolant is steam.

19. The power plant as in claim 1, further comprising a controller electronically coupled to a first control valve fluidly connected between the turbine extraction port and the first gas cooler primary inlet and a second control valve disposed upstream from the secondary inlet of the first gas cooler.

20. The power plant as in claim 19, further comprising a temperature monitor electronically coupled to the controller and in thermal communication with the turbine extraction port upstream from the exhaust duct and a steam flow monitor disposed downstream from the first heat exchanger and electronically coupled to the controller, wherein the controller actuates at least one of the first control valve to increase or decrease the stream of combustion gas from the turbine and the second control valve to increase or decrease mass flow through the secondary inlet of the first gas cooler in response to a data signal provided by the temperature monitor to the controller.

* * * * *